Figure 1:
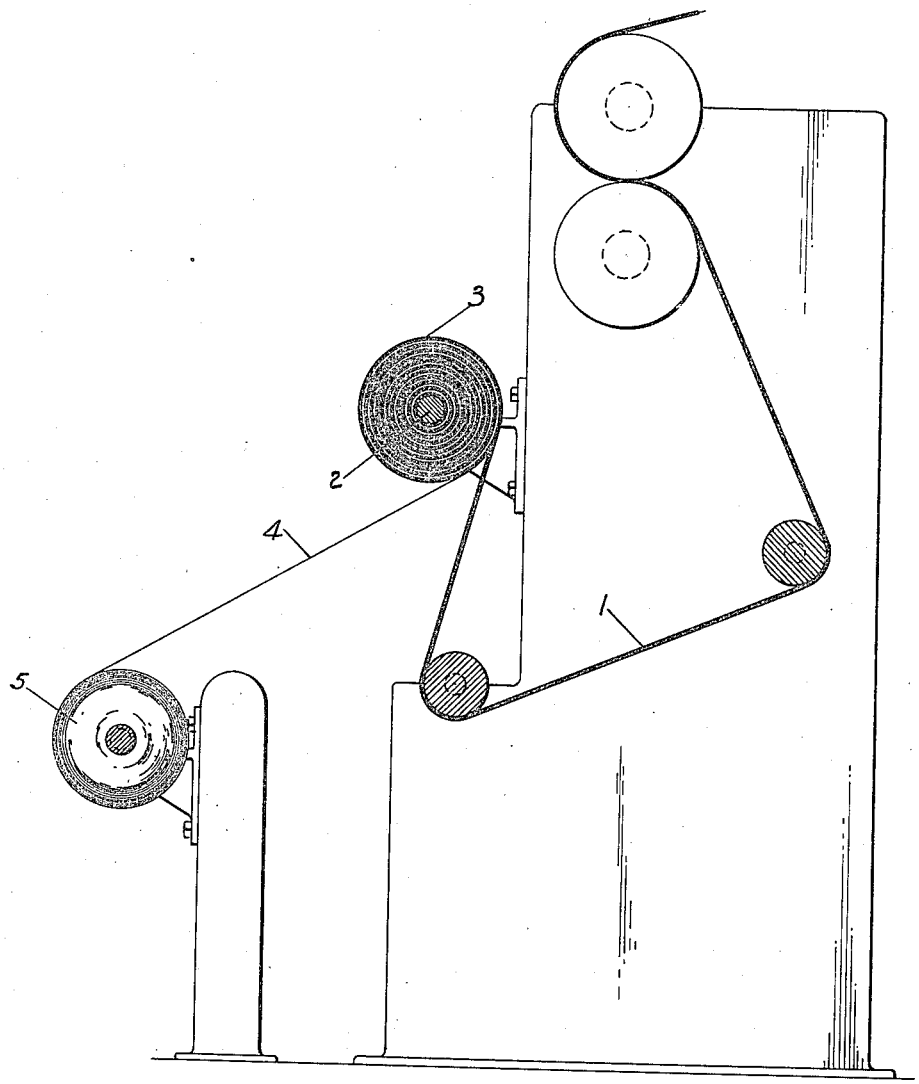

Jan. 12, 1937.　　　　M. KELLER　　　　2,067,667
LINER CLOTH
Filed April 14, 1934

INVENTOR.
Manfred Keller
BY
Charles F. Daley
ATTORNEY.

Patented Jan. 12, 1937

2,067,667

UNITED STATES PATENT OFFICE 2,067,667

LINER CLOTH

Manfred Keller, Syosset, N. Y., assignor, by mesne assignments, to E. I. du Pont de Nemours & Company, Wilmington, Del., a corporation of Delaware Application April 14, 1934, Serial No. 720,670

7 Claims. (Cl. 154—43)

This invention relates to the manufacture of rubber goods. More specifically the invention relates to the use of fabrics used to separate different layers of unvulcanized rubber sheets to prevent their sticking together.

In the manufacture of rubber tires and other rubber goods, fabrics coated with uncured rubber or sheets of uncured rubber are wound on a support to form relatively large rolls. A supporting strip, or liner as it is frequently called, of fabric or other suitable material is usually interposed between windings to maintain different layers of the soft, tacky rubber, separate. Cotton fabric such as heavy cotton duck is commonly used for this purpose, but unless it is treated in one way or another to prevent or minimize sticking, the small fibers or fuzz on the surface of the material will cling tenaciously to the rubber and frequently will cause the rubber gum to be pulled out of shape or will cause the rubber coating to be pulled off on the liner when it is unrolled.

In order to reduce the amount of spoilage and impairment of the rubber sheet or rubberized fabric which would result if the untreated cotton liners were used, various treatments have been devised to improve cotton liner fabrics. Coatings such as linseed oil, nitrocellulose or even coatings of regenerated cellulose formed in situ have been applied to cotton liner cloth. Such treatments are very expensive, in most cases being more than the cost of the untreated fabric, and in spite of expensive treatments, considerable trouble is constantly being experienced in the use of such liner cloths because the fabric still sticks to a certain extent to the uncured rubber. In addition, coated fabrics fail, after a comparatively short period of use, because the coating slowly wears off and the rubber begins to stick to the fabric in those places where the wearing off of the coating is taking place. Likewise, the coated fabrics, after a certain period of use, have to be frequently cleaned and finally have to be disposed of.

Continuous filamentary threads such as regenerated cellulose threads produced by the viscose process exhibit no appreciable tendency to adhere to rubber. This is apparently due to the smooth continuous surface of the filaments comprising the thread or cord from which the fabric is woven as contrasted with the fine, delicate fibers that protrude in every direction from the cotton cords used heretofore in making up liner fabrics.

The figure in the drawing illustrates an apparatus which may utilize my new liner cloth in the lining of rubber sheeting.

It is an object of this invention to produce an improved liner fabric. Another object of this invention is a liner cloth made of such material that it is not necessary to after-treat the fabric, or the threads or cords comprising it to prevent it from sticking to the rubber. Other objects will be apparent from the description which follows.

My invention comprises a liner cloth for use in the rubber manufacturing industry that will not adhere to any appreciable extent to the rubber, which cloth is prepared by weaving continuous filamentary threads such as artificial silk threads produced by the viscose process. More specifically, my invention comprises as a liner cloth a cloth prepared by weaving heavy denier thread or cords of regenerated cellulose without subjecting the same to any treatment to minimize sticking.

The cloth of this invention may be prepared in a number of ways, but, for the purpose of illustration, I give the following example.

Six regenerated cellulose threads made by the viscose process, of 450 denier-72 filaments, twisted 3 turns to the left are doubled and twisted to 2.7 turns per inch right, or in the reverse direction to the elemental thread twist. This plied thread is used for both the warp and the weft in the subsequent weaving of the fabric. The fabric is woven 60 inches wide and has 22½ ends per inch of warp and 23 ends per inch in the filling. The weight of the fabric per square yard is approximately 17 ounces.

Instead of starting with the 450 denier-72 filament, 3-turn yarn, I may use a thread of similar size and filament count having 7 turns per inch, which may be either right or left twist. In this case, the doubling twist is preferably higher, for instance, about 5 turns per inch, or such that a reasonably balanced plied yarn results. I may also use other sizes of threads which may be plied to give the desired ultimate denier and in some instances it may be advantageous to use a single high denier regenerated cellulose thread which will not require doubling. Also, I may weave the thread into fabrics of any dimensions and with various numbers of ends per inch in both the warp and the weft according to the type and structure of cloth desired.

Under certain conditions it may be desirable to use strong regenerated cellulose thread such as threads having a tenacity of over 2 grams, or even 3 grams per denier. In this case, the size of the thread or cord may be somewhat smaller so long as the fabric is sufficiently strong to endure the stresses put upon it.

It is important to note also that regenerated cellulose threads possess relatively high hot strength, i. e., the ratio of strength at elevated temperatures to the strength at room temperatures is high as compared with cotton. Furthermore, rayon endures high temperatures better than cotton, or, in other words, becomes degraded less when subjected to an elevated temperature for a long time. Another characteristic of rayon is that it improves in strength as it becomes drier, or as it loses its water of equilibrium, whereas cotton becomes weaker under similar conditions. These characteristics are all especially important when the yarn is to be used in liner fabrics which are in contact with hot sheets of milled rubber for some time.

The fabric prepared as described above can be used in the rubber fabricating process in place of the usual cotton liner fabric with far greater success. The rayon fabric sticks to the rubber scarcely at all and can be used over a reasonably long period of time without the difficulty encountered with the prior art cotton fabric that is customarily given an expensive treatment. Because it is not necessary that this fabric be treated in any way, the cost of its production is markedly reduced and in view of its greater length of service, a considerable economy results.

Rayon liner cloth has a greater flexibility than holland cloth which is customarily used as a liner cloth and there is less tendency in the rayon fabric to become permanently creased and thus to impair the rubber.

As stated above, prior art liner cloth has a tendency to fuzz. Even the coated liner cloth, such as holland cloth, will fuzz as the coating wears off. In the case of rayon liner cloth, prepared from continuous rayon filaments, there is no tendency to fuzz. This habit is particularly undesirable in the case of colored rubber since the fuzz, in addition to impairing the surface of the rubber, detracts from the appearance of the rubber sheet because of the contrasting colors of the fuzz and of the rubber. Where cotton liner cloths are used, this contrasting color effect may be overcome in a measure if the liner cloth is of the same color as the rubber. However, in the practice of the present invention, since the rayon liner cloth does not cause fuzz, there is no necessity for having differently colored liner cloths, and a liner cloth of a single standard color, e. g., white, may be used for all colors of rubber which it is desired to interleave with rayon fabric.

While I have described this invention primarily for the use of threads produced by the viscose process, it is to be understood that it is applicable to continuous filaments of any character that are not readily softened by heat and that have a surface similar to that of the regenerated cellulose threads prepared from viscose. For instance, regenerated cellulose threads produced by the cuprammonium process may also be used to good advantage in liner cloths of the character heretofore described.

The use of a rayon liner cloth is of particular value where sheets of tacky, unvulcanized rubber are wound up into rolls. Referring to the figure in the drawing, a sheet of rubber 1 is wound up on a shaft 2 to form a roll 3. Rayon liner cloth 4 is interleaved between successive layers of rubber sheeting, as shown, being drawn off from any suitable roll 5. It will thus be seen that the succeeding layers of rubber are prevented from adhering to each other by the interleaved rayon fabric.

It is sometimes advisable when winding tacky, unvulcanized rubber sheeting, especially where the same is to be used in the manufacture of rubber tires, to wind up a web of cotton cord or fabric, together with and on the same roll as the rubber sheeting. In this case also, rayon liner cloth may be interleaved between the tacky rubber surface and the reenforcing cotton fabric and thereby prevent a sticking of the cotton fabric to the rubber.

While the use of rayon liner cloth is of particular benefit for the interleaving of sheet rubber adapted for the manufacture of vehicle tires and the like while the rubber is in a tacky, unvulcanized state, it will be understood that my invention may be applied to the use of rayon fabric to prevent the adhesion of rubber either to itself or to other material wherever such adhesion is undesired.

Any variation or modification which conforms to the spirit of the invention is intended to be included within the scope of the claims.

I claim:

1. An article of manufacture comprising a layer of rubber and a layer of a material which will adhere to rubber, interleaved with a layer of rayon fabric whereby to prevent adhesion between said rubber and said material.

2. An article of manufacture comprising a layer of tacky, unvulcanized rubber and a layer of a material which will adhere to tacky, unvulcanized rubber, interleaved with a layer of rayon fabric whereby to prevent adhesion between said rubber and said material.

3. A roll of tacky, unvulcanized rubber sheeting having an interleaving layer of rayon fabric whereby to prevent adhesion between adjacent layers in said roll.

4. A roll of tacky, unvulcanized rubber sheeting having an interleaving layer of regenerated cellulose fabric whereby to prevent adhesion between adjacent layers in said roll.

5. A roll of tacky, unvulcanized rubber sheeting having regenerated cellulose fabric interleaved between the successive layers of rubber whereby to prevent adhesion between adjacent layers in said roll, the regenerated cellulose fabric comprising continuous regenerated cellulose filaments.

6. A roll of tacky, unvulcanized rubber sheeting having regenerated cellulose fabric interleaved between the successive layers of rubber whereby to prevent adhesion between adjacent layers in said roll, the regenerated cellulose fabric comprising continuous regenerated cellulose filaments having a tenacity of at least 3 grams per denier.

7. A roll of tacky, unvulcanized rubber sheeting having regenerated cellulose fabric interleaved between the successive layers of rubber, whereby to prevent adhesion between adjacent layers, the regenerated cellulose fabric comprising continuous regenerated cellulose filaments having a tenacity of at least 2 grams per denier.

MANFRED KELLER.